UNITED STATES PATENT OFFICE.

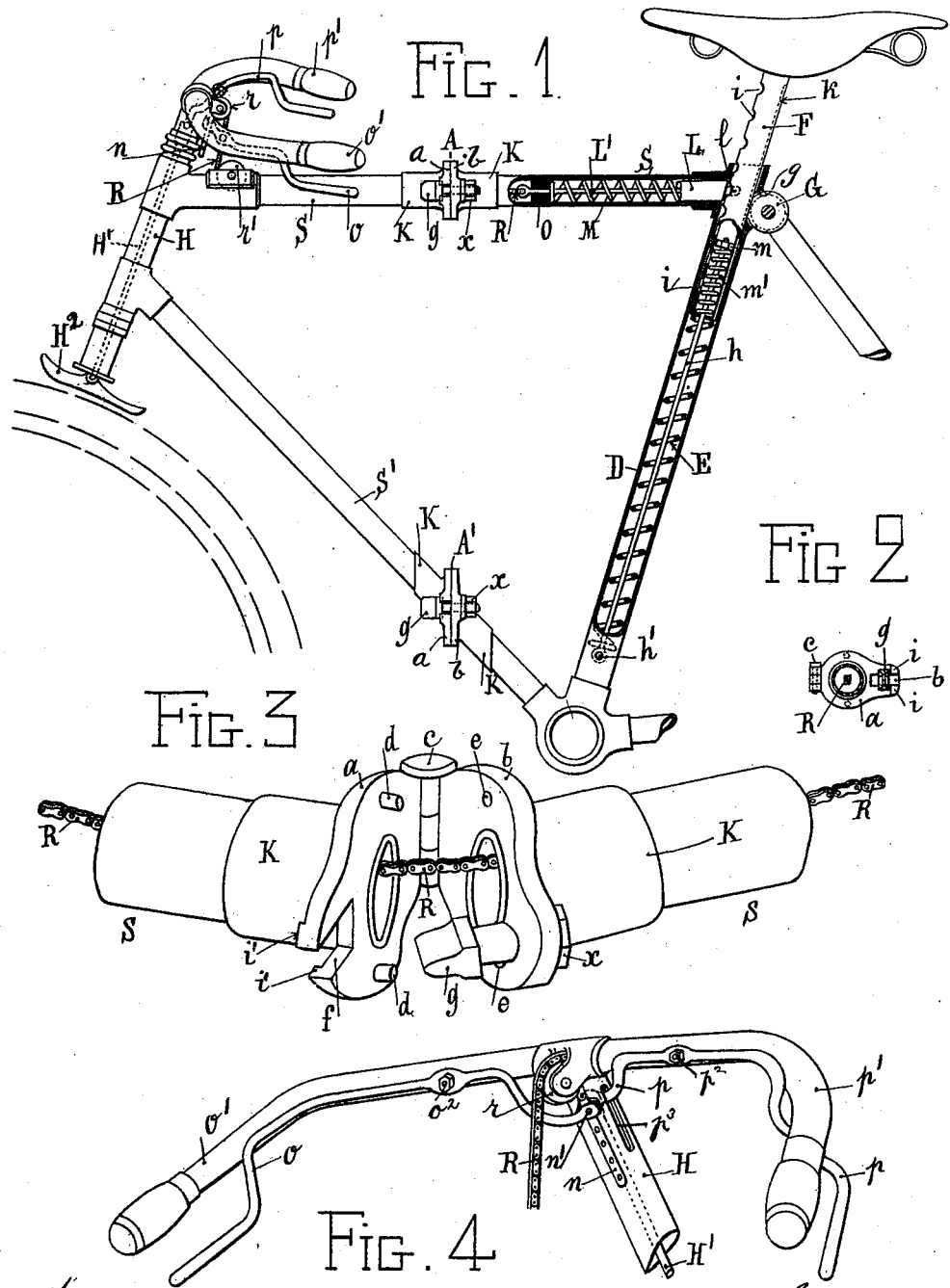

PIERRE LOUIS GIRARDET, FILS, OF PARIS, FRANCE.

BICYCLE.

SPECIFICATION forming part of Letters Patent No. 578,011, dated March 2, 1897.

Application filed February 20, 1896. Serial No. 580,100. (No model.) Patented in France November 29, 1895, No. 243,223.

*To all whom it may concern:*

Be it known that I, PIERRE LOUIS GIRARDET, Fils, a citizen of the French Republic, residing at Paris, France, have invented certain new and useful Improvements in Bicycles, (for which Letters Patent have been obtained in France, No. 243,223, dated November 29, 1895,) of which the following is a full, clear, and exact description.

My invention has relation to bicycles, and among the objects in view is to provide a bicycle which is adapted to be folded together when not in use, so as to occupy but little space, thus adapting the machine for ready shipment and for other purposes.

A further object is to provide a bicycle wherein the height of the seat may be readily adjusted without rendering it necessary for the rider to dismount from the machine in order that said object might be accomplished.

A further object is to provide a bicycle wherein the seat may be automatically adjusted in height from the ground when the rider may be off of the machine.

A still further object is to provide an improved brake mechanism for a bicycle; and with the above and other objects in view, all of which will be hereinafter fully described and made apparent, the invention consists in the novel construction, arrangement, and combination of parts, as hereinafter described, illustrated in the accompanying drawings, and pointed out in the appended claims.

In the drawings, Figure 1 is a side elevation, partly in section, of so much of a bicycle as is necessary to illustrate my invention. Fig. 2 is a cross-sectional view of the upper rod or tube of the machine-frame. Fig. 3 is a perspective view showing the joint of the upper frame-tube in an open or separated position. Fig. 4 is a perspective view showing the operating-levers for the brake and seat rod controlling devices.

My improvements are applicable to the various styles of bicycles and known as "safety-bicycles" as at present constructed, and although I show my invention as being applied to a bicycle having what is known in the art as the "diamond" frame it will be understood that my invention is not confined to such style of frame.

In the drawings, D indicates the seat-post tube, S the upper tube joining the upper end of the seat-post tube to the steering-head H, and S' the inclined tube joining the lower end of the tube D with the steering-head. Arranged within the tube D and adapted to slide therein is the seat-post F, which is provided upon its forward face or edge with a series of depressions, notches, or openings $i$, while in its rear face said post may be provided with a longitudinal groove $k$.

Pivotally arranged upon the frame of the machine at a point adjacent to the upper end of the tube D is a roller G, the peripheral edge of which projects through a slot $g$ in the tube D and engages within the groove $k$, whereby the seat-post will be kept from turning within tube D while being adjusted in the latter.

Slidingly arranged within the rear end of the tube S is a bolt or detent L, the reduced portion or lug $l$ of which is adapted to normally project within a notch $i$ of the seat-post and hold the latter firmly in any adjusted position, and said bolt is held in its engaged position by means of a coiled spring L', which encircles the shank of the bolt and bears against a fixed collar O within the tube S.

In order that the seat-post may be automatically raised when it may be desired to increase the height of the seat, I provide means operating upon the seat-post to force the same upwardly when the locking-bolt L is retracted to free it from a notch $i$, such means consisting of a rod $h$, secured at its lower end within the tube D and extending upwardly within the seat-post, which is preferably hollow for the purpose. Surrounding the rod $h$ is a strong coiled spring E, whose upper end bears against the lower end of the seat-post. Thus it will be seen that when the detent is freed from a notch $i$ the spring E will cause the seat-post to rise, and when the desired height has been attained the detent may be released to allow it to engage another notch.

In order to avoid the too rapid rise of the seat-post, I provide a counteracting-spring $m'$, encircling the upper end of the rod $h$ within the seat-post, which bears at one end against an adjusting-nut $m$ on the rod $h$ and at the other end against the spring E.

In order that the detent may be released, as above set forth, and also that a rider may be enabled to lower the seat-post, should it be desired, without dismounting from the machine, I provide a chain or cable R, which is attached at one end to one end of the shank of bolt L, said chain thence passing forwardly through the tube S and out through a slot therein near the steering-head and around a pulley $r'$, pivotally mounted on the tube S, thence around a second pulley $r$, pivotally mounted on the handle-bar stem, and attached to the upper end of a strap $n$. To the latter by pivot-pin $n'$ is pivotally connected one end of a lever $o$, which is also pivoted at $o^2$ to a handle-bar $o'$ of the machine and having its opposite end lying in proximity to the grip of the said handle-bar and adapted to be grasped by the hand of the rider, and when so operated it will be seen that the chain will be drawn upon to cause the bolt L to slide inwardly to cause it to free the notch $i$, and when the seat-post is so released the weight of the rider will cause the same to descend until the desired height is reached, when by releasing the lever $o$ the spring L will cause the bolt to again engage a notch $i$. By providing a series of perforations in the strap, as indicated, and causing the pivot-pin $n'$ to engage with different perforations the inner end of the lever may be adjusted to vary the throw and consequently the extent of movement of the bolt L.

To provide for the folding of the machine, the tubes S S' are divided in exactly the same vertical plane, as indicated at A A'. Each of the sections of the tubes is provided with reinforcing-sleeves K, integral with which are flanges $a\,b$, which are hinged or jointed together, as at $c$, to permit the folding of the parts and to lock or hold the tube-sections firmly in the closed position represented in Fig. 1. The flanges $a\,b$ are provided with interlocking tenons and sockets, as $d$ and $e$, as represented in Fig. 3, and to maintain perfect alinement of the tubes S S' and at the same time prevent accidental separation of the sections of said tubes I provide locking means consisting of a swiveled bolt on one of the flanges, having a head $g$, which is adapted to be passed through a recess $f$ in the opposing flange and be then turned at right angles to engage behind the latter flange, as represented in Figs. 1 and 2. To still further provide against accidental turning of the bolts $g$, which might free the tube-sections, I provide the flange $a$, adjacent to the recess $f$, with offsets $i'$, against which the edge of the head $g$ bears when in the locking position, and also provide the bolt with an adjusting-nut $x$ in rear of flange $b$, so that the bolt may be tightened in the position just described.

It will be noted that the chain R does not interfere in any way with the folding feature of my machine, so that such folding may be accomplished readily whenever desired.

The brake device of my machine consists of the brake-rod H', which passes through the steering-head and carries at its lower end the brake-shoe $H^2$, while its upper end is engaged by one end of a brake-lever $p$, which passes through a slot $p^3$ in the steering-head, and being pivoted at $p^2$ to the handle-bar $p'$ and having its opposite end lying in proximity to the grip of said handle-bar. By this arrangement of brake device a very neat appearance is obtained, the brake-rod being entirely hidden from view and not liable to become injured in the use of the machine.

What I claim, and desire to secure by Letters Patent, is—

1. A bicycle having its upper horizontal and lower diagonal frame-tubes divided in the same vertical plane, and jointed or hinged together as described, abutting flanges on the tube-sections, swiveled locking-bolts carried by the flanges of one section of the tubes, and adapted to pass through recesses in the opposing flanges and be turned at right angles to lock the sections together, as specified.

2. A bicycle having its upper horizontal and lower diagonal frame-tubes divided in the same vertical plane and jointed or hinged together as described, abutting flanges on the tube-sections, swiveled locking-bolts carried by the flanges of one section of the tubes, and adapted to pass through recesses in the opposing flanges and be turned at right angles to lock the sections together, and an adjusting and tightening nut carried by each of the said bolts for the purpose specified.

3. A bicycle having its upper horizontal and lower diagonal frame-tubes divided in the same vertical plane and jointed or hinged together as described, abutting flanges on the tube-sections, swiveled locking-bolts carried by the flanges of one section of the tubes, and adapted to pass through recesses in the opposing flanges and be turned at right angles to lock the sections together, and offsets on the flanges having the recesses with which offsets said bolts are adapted to engage as described.

4. A bicycle having its upper horizontal and lower diagonal frame-tubes divided in the same vertical plane and jointed or hinged together, as described, the reinforcing-sleeves, the flanges integral with said sleeves the interlocking tenons and sockets on and in the said flanges, swiveled locking-bolts carried by the flanges of one section of the tubes and adapted to pass through recesses in the other flanges and to be turned at right angles to lock the sections together.

In testimony that I claim the foregoing I have hereunto set my hand this 30th day of January, 1896.

PIERRE LOUIS GIRARDET, Fils.

Witnesses:
 VICTOR MATRAY,
 MARCEL MONNIER.